United States Patent [19]

Vita et al.

[11] Patent Number: 5,716,665
[45] Date of Patent: Feb. 10, 1998

[54] PROCESS FOR COATING AN ELECTROCONDUCTIVE MATERIAL USING FOAMABLE SOLID COMPOSITIONS BASED ON PERFLUOROPOLYMERS

[75] Inventors: Giandomenico Vita, Como; Massimo Pozzoli, Monza; Domenico De Angelis, Varese, all of Italy

[73] Assignee: Ausimont S.p.A., Italy

[21] Appl. No.: 444,514

[22] Filed: May 19, 1995

[30] Foreign Application Priority Data

May 23, 1994 [IT] Italy ................. MI94A1038

[51] Int. Cl.$^6$ ........................................ B05D 5/12
[52] U.S. Cl. ..................... 427/119; 427/120; 427/244; 427/247
[58] Field of Search ................. 524/366, 462; 427/119, 120, 244, 247

[56] References Cited

U.S. PATENT DOCUMENTS

| | | | |
|---|---|---|---|
| 3,072,583 | 1/1963 | Randa | 260/2.5 |
| 3,665,041 | 5/1972 | Sianesi et al. | 252/54 |
| 4,523,039 | 6/1985 | Lagow et al. | 568/615 |
| 5,093,400 | 3/1992 | Arcella et al. | 524/366 |
| 5,210,123 | 5/1993 | Caporiccio | 524/462 X |
| 5,286,773 | 2/1994 | Sterling | 524/366 |
| 5,306,758 | 4/1994 | Pellerite | 524/366 |
| 5,446,081 | 8/1995 | Sonoi | 524/366 X |

FOREIGN PATENT DOCUMENTS

| | | |
|---|---|---|
| 0148482A2 | 7/1985 | European Pat. Off. . |
| 92/21715 | 12/1992 | WIPO . |
| 94/00511 | 1/1994 | WIPO . |

*Primary Examiner*—Judy M. Reddick
*Attorney, Agent, or Firm*—Finnegan, Henderson, Farabow, Garrett & Dunner, L.L.P.

[57] ABSTRACT

The invention relates to a foamable solid composition based on thermoprocessable perfluoropolymers comprising, homogeneously dispersed in the polymeric matrix, 0.05–20% by weight of a liquid fluoropolyether having molecular weight lower than 3,500 and 0.002–10% by weight of a nucleating agent. The composition results to be suitable for extruding foamed cables.

10 Claims, No Drawings

PROCESS FOR COATING AN ELECTROCONDUCTIVE MATERIAL USING FOAMABLE SOLID COMPOSITIONS BASED ON PERFLUOROPOLYMERS

The present invention relates to foamable solid compositions based on perfluoropolymers comprising, homogeneously dispersed in the polymeric matrix, a liquid fluoropolyether and a nucleating agent, the relevant preparation process and to their use in preparing foamed coatings.

It is known the use of perfluoropolymers in the coatings field, in particular in electric wires coating due to their high properties, such as:

thermal resistance which can reach up to 260° C.

high volume and surface resistivity high dielectric rigidity low dielectric constant low dissipation factor high resistance to chemical agents and to moisture.

Such properties make perfluoropolymers particularly suitable to the use in the microcable and in the data transmission field, wherein the low values of dielectric constant and of dissipation factor make it possible the manufacture of miniaturised cables capable of offering a good insulation also at very high voltages, with minimum capacitive properties of the insulating sheath and with consequent reduced distortion of the electric signals which, in the digital or in the so called microwaves transmission, are transmitted at frequencies which can exceed even 10 GHz.

In the data transmission field it is in particular known that it is possible to obtain, by means of foaming or blowing techniques, foamed sheaths of perfluoropolymers having dielectric constants lower than those of shears of perfluoropolymers as such.

The known techniques for perfluoropolymers foaming generally use a nucleating agent and, as blowing agent, a gas or compounds generating a gas at the extrusion temperatures of the polymer.

Such blowing agents are generally introduced into the perfluoropolymer contemporaneously with the extrusion step on the wire with remarkable problems for their dosage and consequent difficulty to obtain foamed polymers with a high degree of voids and having uniform and fine cells, without having a cable surface irregular or rough with coarse cell structure.

In particular the use of organic and inorganic solid blowing or expanding agents, which thermally decompose generating a gas, show remarkable problems since, at the high temperatures required for fluoropolymers extrusion, such agents quickly decompose thus making it difficult to adjust the degree of voids, the cells uniformity and their fineness in the foamed polymer, moreover their decomposition products can modify the perfluoropolymer good properties, in particular the dielectric ones.

From U.S. Pat. No. 3,072,583 a process for preparing perfluoropolymers foam coated cables is known, wherein chlorofluorocarbons (CFC), preferably $CHClF_2$, are used as blowing agents, in the presence of boron nitride as nucleating agent.

According to such process the CFC is caused to penetrate under pressure into the polymer which is then fed to an extruder to directly obtain at the die outlet the foamed polymer used for the wire coating.

Such process shows the drawback that it is difficult to adjust the CFC amount introduced into the polymer and, moreover, it is not possible to obtain wires coated with foamed polymers by extruding the material admixed with CFC, in an extruder different from that used for the addition itself. The forced coupling of the addition and the wire coating process makes it consequently very difficult to obtain high expansion ratios with uniformn and fine cells, especially in the microcables field.

It is also known a process for perfluoropolymers foaming which employs nitrogen, as blowing agent, which is injected under pressure of 400–500 bar during the cable extrusion.

Such process shows the drawback that it is necessary to operate at high pressures and the adjustment of the gas amount injected under pressure in relation to the extruder capacity results difficult and critical, in order to be able to obtain high expansion ratios and a controlled and uniform foaming wherein the foamed polymer shows closed, fine and uniform cells, especially in the microcables field where the foamed sheath has low thicknesses of about 1 mm.

Moreover such a process needs a substantial modification of the extruders at present used for extruding perfluoropolymers cables.

Particular expansible or foamable solid compositions have now been found, based on perfluoropolymers containing homogeneously dispersed in the polymeric matrix a liquid fluoropolyether and a nucleating agent which can be fed into the usual extruders at present used for preparing perfluoropolymers cables and which permit to obtain foamed cables with high properties, without showing the drawbacks of the known methods.

Such expansible compositions result stable and capable to be stored for a long time and do not need the modification of the usual extruders for perfluoropolymers cables.

By using said foamable compositions it is possible to carry out the extrusion of the foamed cable in a simple way, where the control of the obtainable degree of voids and of the fineness and uniformity of the expanded cells does not result critical, thus obtaining foamed cables, wherein the sheath shows a fine and uniform cell structure without irregularities or surface roughness also for very low thicknesses of about 1 mm.

Object of the present invention is therefore an expansible or heat foamable solid composition based on perfluoropolymers comprising:

(a) at least one thermoprocessable perfluoropolymer and homogeneously dispersed in the polymeric matrix, (b) from 0.002 to 10% by weight with respect to the polymer (a) of a nucleating agent (c) from 0.05 to 20% by weight with respect to the polymer (a) of a fluoropolyether consisting of fluorooxyalkylene units selected from the following ones:

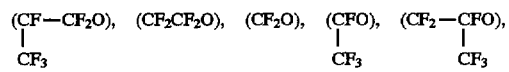

$CF_2CF_2CF_2O$, $(CF_2CF_2CH_2O)$, said units being statistically distributed in the polymeric chain, having neutral fluoroalkyl or perfluoroalkyl end groups which can contain H or Cl and having a number average molecular weight lower than 3,500, preferably from 350 to 2,500, more preferably from 900 to 1,800, said composition being obtainable by mixing the polymer (a) in the molten state with the components (b) and (c) and subsequent cooling, in order to have a substantially unexpanded solid composition, having a density of 7% at most lower than that of the polymer (a).

As components (a) can be used the copolymers of tetrafluoroethylene (TFE) with perfluoroalkylvinylethers in particular with perfluoro(propylvinylether) (PFA) or with perfluoro(methylvinylether) (MFA), copolymers of TFE with hexafluoropropene (FEP), thermoprocessable TFE polymers slightly modified with small amounts of polymerizable monomers or their mixtures.

Said perfluoropolymers have a fluorine content of at least 60% by weight and a number average molecular weight from 500,000 to 2,000,000.

As components (b) can be used inorganic or organic expansion nucleating agents finely subdivided, known in the art, capable of adjusting the arrangement of bubbles growing inside the molten perfluoropolymer.

Among these, boron or silicon nitride, silica, alumina, talc, zinc sulphide, PTFE powders having melting point higher than that of the polymer (a) can for instance be cited. They are preferably used in amounts from 0.02 to 2% by weight on the polymer (a).

As components (c) fluoropolyethers belonging to the following classes can in particular be used:

1) $R_fO(CF-CF_2O)_n(CFO)_m(CF_2O)_pR'_f$
$\phantom{R_fO(}|\phantom{CF_2O)_n(}|$
$\phantom{R_fO(}CF_3\phantom{CF_2O)_n}CF_3$ having "random" distribution of the perfluorooxyalkylene units, wherein m, n, p have average values such as to meet the aforesaid requirements of average molecular weight previously indicated; wherein $R_f$ and $R'_f$ equal or different from each other are fluoroalkyl or perfluoroalkyl end groups;

2) $R_fO(CF_2CF_2O)_n(CF_2O)_mR'_f$ having "random" distribution of the perfluorooxyalkylene units, wherein n, m have values such as to meet the aforesaid requirements;

3) $R_fO(CF_2CF_2O)_n(CF_2O)_m\left(\begin{array}{c}CFO\\|\\CF_3\end{array}\right)^p\left(\begin{array}{c}CF-CF_2O\\|\\CF_3\end{array}\right)^o-R'_f$ wherein m, n, p, o have values such as to meet the above indicated requirements;

4) $R_fO\left(\begin{array}{c}CF-CF_2O\\|\\CF_3\end{array}\right)^n-R'_f$ wherein n has a value such as to meet the above indicated requirements:

5) $R_fO(CF_2CF_2O)_nR'_f$ wherein R has average value such as to meet the aforesaid requirements;

6) $R_fO(CF_2CF_2CF_2O)_nR'_f$ or $R_fO(CH_2CF_2CF_2O)_nR'_f$ wherein n has value such as to meet the above indicated requirements.

In said classes $R_f$, $R'_f$, equal or different from each other, are neutral fluoroalkyl or perfluoroalkyl end groups, preferably from 1 to 3 carbon atoms, which can be selected from:

$CF_2Y-$, $CF_2YCF_2-$, $CF_3CFY-$, $YCF_2CF(CF_3)-$, $YCF(CF_3)CF_2-$, wherein Y is F, Cl or H.

Perfluoropolyethers of class 1) are commercially known by the trade mark FOMBLIN Y® or GALDEN®, those of class 2) by the trade mark FOMBLIN Z® all of Montedison. Products of class 4) commercially known are KRYTOX® (Du Pont).

The products of class 5) are described in U.S. Pat. No. 4,523,039; those of class 6) are described in European patent EP 148,482 of Daikin.

The ones of class 3) are prepared according to U.S. Pat. No. 3,665,041.

Preferably the fluoropolyethers, to be used according to the present invention, have a vapour pressure lower than 10 bar between the average melting temperature of the polymer (a) and a temperature of 30° C. higher than this temperature; they can preferably be used in amounts from 0.1 to 16% by weight on the polymer (a).

Preferred examples of fluoropolyethers are those of the class 1) indicated above, put on the market by Ausimont as GALDEN® D 40 and GALDEN® HT 270, both having perfluorinated end groups or similar perfluoropolyethers wherein Y in the end groups is H.

In addition to the components (a), (b) and (c), the expansible composition can contain other aditives known in the art, such as for instance lubricants, stabilizers, reinforcing agents and pigments.

The process for preparing the heat expansible solid composition based on perfluoropolymers comprises:

1. quick mixing and homogenization of the perfluoropolymer
   (a) in the molten state with 0.002–10% by weight on (a), of a nucleating agent (b) and 0.05–20% by weight of at least one fluoropolyether as previously defined at temperatures between the melting temperature of the polymer (a) and the one at which the fluoropolyether (c) has a vapour pressure lower than 10 bar;
2. extrusion of the mixture in a die;
3. quenching of the extruded product, so as to obtain a substantially unexpanded solid composition, having a density of 7% at most lower than that of the starting perfluoropolymer (a).

The process can be carried out in a monoscrew or twin screw extruder equipped with injection port for the injection in the molten polymer of the components (b) and (c) and with a granulator formed by a die, by a water quenching system and by a cutting device.

In practice the perfluoropolymer is fed to the extruder provided with a heating system, where it is melted and then admixed by injection with the liquid fluoropolyether and the nucleating agent, which are subsequently mixed in the extruder, then extruded through a die at the outlet of which the so obtained small rods are quenched in a water bath and cut in the form of pellets.

The nucleating agent and possible other solid additives can optionally be premixed with the perfluoropolymer or with the fluoropolyether fed to the extruder.

The screw extruder must have a good mixing power, i.e. capable of carrying out the mixing and homogenization of the molten perfluoropolymer-fluoropolyether-nucleating agent mixture in very short times and at a controlled and constant temperature during the mixing step, selected so that the mixture at the outlet from the extruder results substantially unexpanded.

In other words the temperature must be such that the fluoropolyether remains substantially in the liquid state during the mixing step.

In practice there are used fluoropolyethers which at the temperature at which the mixing is carried out have a vapour pressure not higher than 10 bar.

The cooling of the molten mixture at the die outlet is quickly carried out, preferably within 3 seconds from the die outlet.

Granules of perfluoropolymer substantially unexpanded are thus obtained, containing homogeneously dispersed the liquid fluoropolyether and the nucleating agent.

In particular by using perfluoropolymers having a density in the solid state of 2.12–2.15 g/cc, expansible granules having a density not lower than 2 g/cc are obtained.

The so obtained expansible granules result stable and capable to be stored at room conditions for long periods of time.

The expansible or foamable solid composition based on perfluoropolymers of the present invention, in particular in the form of granules, results suitable for obtaining coatings of expanded perfluoropolymers on electric wires.

In particular the foamable solid composition of the present invention can be used directly in the conventional plants for extruding coatings of thermoprocessable fluorinated polymers on electric wires comprising an extruder and a die, without having to carry out any modification of the existing plants.

Obviously it is only necessary to carry out the extrusion so that the temperature of the melted polymer at the die outlet is such that the used fluoropolyether has a vapour pressure higher than 10 bar, preferably higher than 20 bar, to obtain the fluoropolymer expansion.

It is moreover preferable to use dies operating under pressure or of semitube type, capable of better adjusting the pressure drop of the melted mixture at the die outlet, which allows the expansion of the fluoropolyether, i.e. its transition from the liquid state to the vapour state and thus obtain the perfluoropolymer foaming.

The foamed coatings on electric wires obtainable with the expansible composition of the present invention, are characterized by having a degree of voids or expansion ratio up to 60% with respect to the initial density for coating thicknesses of about 1 mm, by low values of dielectric constant and by values of strip force comparable with those typical of the hook-up wires coated with unexpanded fluorinated polymers.

The expansible compositions according to the present invention result therefore particularly suitable for preparing foamed electric microcables and generally for insulating coatings on electroconductive materials, as well as for heat and sound insulation.

Some examples are given for illustrative purposes of the invention.

EXAMPLES 1–16

Preparation of expansible compositions

In all the examples for the preparation of foamable compositions based on perfluoropolymers a DAVIS ELECTRIC mono-screw extruder was used, having a 37 mm diameter, with a length/diameter ratio of 30, equipped with an access port for introducing liquids.

The screw structure is such that it can be divided into 7 zones: transition, compression, metering, fluoropolyether injection, compression, metering, mixing.

The final mixing step is obtained by a pine-apple type terminal, capable of assuring a perfect homogenization among nucleating agent, perfluoropolymer and fluoropolyether. The introduction of the nucleating agent was carried out starting from a master-batch of perfluoropolymer containing 5% by weight of the nucleating agent, which is then dry-blended with the perfluoropolymer before its introduction in the extruder hopper.

The introduction of fluoropolyether was carried out by injecting the liquid fluoropolyether through the access-port put in the extruder, using a volumetric dosing pump.

The melted mixtures so obtained were extruded through a die having three holes of 2 mm, placed at the extruder outlet, subsequently cooled in a water bath and finally granulated with a blade cutter.

The arrangement of the water bath and the outlet rate from the die are adjusted in such a way so as to limit within three seconds the time between the outlet of the melted mixture from the die holes and its inlet in the water bath.

In Table 1 are reported for each example the characteristics of the preparation process and of the obtained expansible compositions, in particular are indicated:

the used perfluoropolymer wherein:
   FEP means the TFE/hexafluoropropene copolymer TEFLON® FEP 100 of Du Pont;
   MFA means the TFE/perfluoro(methylvinylether) copolymer HYFLON MFA 640 of Ausimont;
   PFA means the TFE/perfluoro(propylvinylether) copolymer HYFLON PFA 450 of Ausimont;

the employed nucleating agent and its introduced amount, wherein:
   BN means an extrapure boron nitride, having an average granulometry of 5 microns;
   PTFE means the polytetrafluoroethylene ALGOFLON® L 203 of Ausimont, having an average granulometry of 5 microns;

the fluoropolyether used wherein:
   D 40 means the perfluoropolyether GALDEN® of Ausimont;
   HT 270 means the fluoropolyether GALDEN® HT 270 of Ausimont;
   H-G means a fluoropolyether equivalent as to viscosity and other chemical physical characteristics to GALDEN® D 40 but having partially fluorinated end groups;

the amount of fluoropolyether introduced, derived from mass balance on the extruder, by knowing the feeding pump flow-rate and the flow-rate of the polymer fed by the extruder screw;

the temperature of the melted mixture (T mixture) at the outlet of the extruder, measured by means of an immersion thermocouple place on the extruder head.

the amount of fluoropolyether actually present in the obtained foamable granule, determined by a quantitative analysis carried out by infrared rays spectroscopy in Fourier transform;

the final density of the obtained expansible mixture granule, measured according to ASTM D 792 standard.

The examples from 13 to 16 are comparative examples wherein no fluoropolyether has been used.

EXAMPLES 17–32

Preparation of foamed cables by using the expansible compositions (granules) of examples from 1 to 12 and of comparative unfoamed cables using the granules of the comparative examples from 13 to 16.

For preparing foamed cables and comparative unfoamed cables the same DAVIS ELECTRIC extruder of Examples 1–16 was used, equipped with a three sections screw, of the conventional type used for extruding unfoamed cables of perfluoropolymers and having a B&H extrusion head provided with a pressure die.

The cables obtained in all the examples have a 1 mm conductor of 19 wires copper plait and an external diameter equal to 3±0.1 Mm.

In Table 2 are reported for each example:
   the type of expansible and unexpansible granule, fed in the extruder, obtained according to the examples 1–16, the melting temperature at the extruder head, obtained from the fed granule, the dielectric consant K of the obtained cable, calculated from the capacitance values C measured with a Zumbach model CAPAC 300 capacity meter, put in line with the extruder.

The dielectric constant was calculated with the formula: $K=C/24.16\log(D/0.97)$, wherein C is expressed in pF/m and D is the external diameter in mm of the obtained cable, the degree of void V% of the coating or extruded sheath of the cable, calculated with the formula $$V\% = [2.01-K).(2K+1)/3.3K].100$$

the density of the extruded sheath, measured according to ASTM D 792 standard, the value of the strip force for the sheath extrusion, measured according to ASTM D 3032/27 standard.

We claim:

1. A process for coating an electroconductive material by using an expandable solid composition based on perfluoropolymers comprising:

(a) at least one thermoprocessable perfluoropolymer, (b) from 0.002 to 10% by weight with respect to the polymer (a) of a homogeneously dispersed nucleating agent, and (c) from 0.05 to 20% by weight with respect to the polymer (a) of a homogeneously dispersed fluoropolyether consisting of fluorooxyalkylene units selected from the group consisting of:

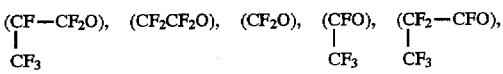

TABLE 1

| Example No. | Fluoro-polymer | Nucleating Agent Type | Nucleating Agent Quantity ppm | Fluoropolyether Type | Fluoropolyether Introduced amount % by weight | T mixture (°C.) | Fluoropoly-ether in the granule % by weight | Density of granule g/cc |
|---|---|---|---|---|---|---|---|---|
| 1 | FEP | BN | 500 | D 40 | 6 | 350 | 0.6 | 2.10 |
| 2 | MFA | BN | 500 | D 40 | 6 | 350 | 0.6 | 2.10 |
| 3 | PFA | BN | 500 | D 40 | 8 | 350 | 0.55 | 2.10 |
| 4 | FEP | PTFE | 500 | D 40 | 6 | 350 | 0.6 | 2.10 |
| 5 | MFA | PTFE | 500 | D 40 | 6 | 350 | 0.6 | 2.10 |
| 6 | PFA | PTFE | 500 | D 40 | 8 | 350 | 0.55 | 2.10 |
| 7 | FEP | BN | 500 | HT270 | 10 | 340 | 0.45 | 2.05 |
| 8 | MFA | BN | 500 | HT270 | 10 | 340 | 0.45 | 2.05 |
| 9 | PFA | BN | 500 | HT270 | 12 | 345 | 0.35 | 2.05 |
| 10 | FEP | BN | 500 | H-G | 6 | 350 | 0.55 | 2.08 |
| 11 | MFA | BN | 500 | H-G | 6 | 350 | 0.55 | 2.08 |
| 12 | PFA | BN | 500 | H-G | 8 | 350 | 0.50 | 2.08 |
| 13 comparative | PFA | BN | 500 | — | — | 350 | — | 2.14 |
| 14 comparative | MFA | BN | 500 | — | — | 350 | — | 2.14 |
| 15 comparative | PFA | — | — | — | — | 350 | — | 2.14 |
| 16 comparative | MFA | — | — | — | — | 350 | — | 2.14 |

TABLE 2

| Example No. | Granule of Ex. | Melted temp. °C. | K | Degree of voids of Sheath % | Sheath Density g/cc | Strip Force Newton |
|---|---|---|---|---|---|---|
| 17 | 1 | 410 | 1.37 | 60 | 0.85 | 25 |
| 18 | 2 | 410 | 1.37 | 60 | 0.85 | 28 |
| 19 | 3 | 420 | 1.39 | 58 | 0.88 | 25 |
| 20 | 4 | 400 | 1.46 | 52 | 0.95 | nd |
| 21 | 5 | 400 | 1.44 | 54 | 0.92 | nd |
| 22 | 6 | 400 | 1.44 | 54 | 0.92 | nd |
| 23 | 7 | 380 | 1.54 | 45 | 1.12 | nd |
| 24 | 8 | 380 | 1.54 | 45 | 1.12 | nd |
| 25 | 9 | 380 | 1.71 | 30 | 1.6 | nd |
| 26 | 10 | 400 | 1.39 | 58 | 0.88 | nd |
| 27 | 11 | 400 | 1.39 | 58 | 0.88 | nd |
| 28 | 12 | 400 | 1.44 | 54 | 0.92 | nd |
| 29 comparative | 13 | 400 | 2.1 | 0 | 2.14 | 28 |
| 30 comparative | 14 | 400 | 2.1 | 0 | 2.14 | 33 |
| 31 comparative | 15 | 400 | 2.1 | 0 | 2.14 | 30 |
| 32 compatative | 16 | 400 | 2.1 | 0 | 2.14 | 32 | nd = not determined $CF_2CF_2CF_2O$, $(CF_2CF_2CH_2O)$, said units being statistically distributed in the polymeric chain and having neutral fluoroalkyl or perfluoroalkyl end groups and having a number average molecular weight lower than 3,500, said composition obtained by mixing the polymer (a) in the molten state with the components (b) and (c) and subsequent cooling, in order to have a solid composition having a density of at most 7% lower than that of the polymer (a), and extruding said composition on the electroconductive material at such a temperature that the fluoropolyether (c) has a vapor pressure higher than 10 bar.

2. The process to claim 1, wherein the expandable composition is extruded at such a temperature that the fluoropolyether (c) has a vapour pressure higher than 20 bar.

3. The process of claim 1, wherein:
said neutral fluoroalkyl or perfluoroalkyl end groups contain H or Cl.

4. The process according to claim 1, wherein the component (a) is a thermoprocessable perfluoropolymer selected from the group consisting of the copolymers of tetrafluoroethylene with perfluoroalkylvinylethers or with hexafluoropropene and the tetrafluoroethylene polymers modified with polymerizable monomers, having a number average molecular weight from 500,000 to 2,000,000.

5. The process according to claim 4, wherein the perfluoroalkylvinylether of the tetrafluoroethylene copolymer is selected from the group consisting of perfluoro (propylvinylether) and perfluoro (methylvinylether).

6. The process according to claim 1, containing from 0.02 to 2% by weight of the polymer (a) of a nucleating agent (b) selected from the group consisting of boron nitride and high-melting polytetrafluoroethylene powders.

7. The process according to claim 1, wherein the fluoropolyether (c) has a number average molecular weight from 350 to 2,500 and it is used in amounts from 0.1–16% by weight with respect to the polymer (a).

8. The process according to claim 7, wherein the fluoropolyether (c) has a number average molecular weight from 900 to 1,800.

9. The process according to claim 7, wherein the fluoropolyether (c) is selected from the group consisting of fluoropolyethers having the formula:

1) 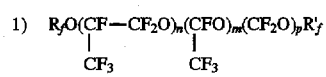

with random distribution of the perfluorooxyalkylene units, where $R_f$ and $R'_f$ are equal to or different from each other and are fluoroalkyl end groups selected from the group consisting of $CF_2Y-$, $CF_2YCF_2-$, $CF_3CFY-$, $YCF_2CF(CF_3)-$, and $YCF(CF_3)CF_2-$, wherein Y is F, Cl or H and wherein n, m and p are numbers selected so that the fluoropolyether has a number average molecular weight lower than 3,500.

10. The process according to claim 9, wherein the end groups of the fluoropolyether Y comprise H or F.

* * * * *